(12) United States Patent
Aubé

(10) Patent No.: US 10,007,039 B2
(45) Date of Patent: Jun. 26, 2018

(54) MULTILAYER OPTICAL INTERFERENCE FILTER

(71) Applicant: LEDTECH INTERNATIONAL INC., Montreal (CA)

(72) Inventor: Martin Aubé, Saint-Camille (CA)

(73) Assignee: 8797625 CANADA INC., Montreal (CA)

( * ) Notice: Subject to any disclaimer, the term of this patent is extended or adjusted under 35 U.S.C. 154(b) by 374 days.

(21) Appl. No.: 14/430,992

(22) PCT Filed: Sep. 26, 2013

(86) PCT No.: PCT/CA2013/000824
§ 371 (c)(1),
(2) Date: Mar. 25, 2015

(87) PCT Pub. No.: WO2014/047724
PCT Pub. Date: Apr. 3, 2014

(65) Prior Publication Data
US 2015/0253478 A1    Sep. 10, 2015

Related U.S. Application Data

(60) Provisional application No. 61/705,828, filed on Sep. 26, 2012.

(51) Int. Cl.
*G02B 5/28*    (2006.01)
*B60J 3/00*    (2006.01)
(Continued)

(52) U.S. Cl.
CPC .............. *G02B 5/285* (2013.01); *B60J 3/007* (2013.01); *F21V 9/08* (2013.01); *G02C 7/107* (2013.01);
(Continued)

(58) Field of Classification Search
CPC ........... G02B 5/285; G02B 5/23; G02F 1/157; F21W 2131/208; B60J 3/007; F21V 3/0472; F21V 9/08; F21Y 2115/10; G02C 7/107
(Continued)

(56) References Cited

U.S. PATENT DOCUMENTS 2,412,496 A    12/1946    Dimmick
2,624,238 A    1/1953    Dimmick
(Continued)

FOREIGN PATENT DOCUMENTS

CA    2153019 A1    1/1996
CA    2803788 A1    8/2006
(Continued)

OTHER PUBLICATIONS

Tikhonravov et al. Development of the needle optimization technique and new features of OptiLayer design software, Proc. SPIE, vol. 2243, Nov. 4, 1994.
(Continued)

*Primary Examiner* — William R Alexander
*Assistant Examiner* — Tamara Y Washington
(74) *Attorney, Agent, or Firm* — Eric L. Lane; Green Patent Law

(57) ABSTRACT

Multilayer optical interference filter for filtering light constructed by alternating materials having different refractive indexes, with layer thicknesses calculated in order to achieve a transmittance in accordance with the inverse of the Melatonin Suppression Action Spectrum.

26 Claims, 11 Drawing Sheets

(51) Int. Cl.
  *F21V 9/08* (2018.01)
  *G02C 7/10* (2006.01)
  *F21V 3/10* (2018.01)
  *F21W 131/208* (2006.01)
  *G02B 5/23* (2006.01)
  *G02F 1/157* (2006.01)
  *F21Y 115/10* (2016.01)

(52) U.S. Cl.
  CPC .......... *F21V 3/10* (2018.02); *F21W 2131/208* (2013.01); *F21Y 2115/10* (2016.08); *G02B 5/23* (2013.01); *G02F 1/157* (2013.01)

(58) Field of Classification Search
  USPC .................................................. 359/577–590
  See application file for complete search history.

(56) References Cited

U.S. PATENT DOCUMENTS

| | | | |
|---|---|---|---|
| 3,579,130 | A | 5/1971 | Smiley |
| 3,853,386 | A | 12/1974 | Pulker et al. |
| 3,944,440 | A | 3/1976 | Franz |
| 4,099,840 | A | 7/1978 | Van der Wal et al. |
| 4,373,782 | A | 2/1983 | Thelen |
| 4,838,629 | A | 6/1989 | Maruyama et al. |
| 5,007,710 | A | 4/1991 | Nakajima et al. |
| 5,083,858 | A | 1/1992 | Girerd |
| 5,189,551 | A * | 2/1993 | Woodard ............... B32B 27/36 359/360 |
| 5,274,403 | A | 12/1993 | Gott |
| 5,274,661 | A | 12/1993 | von Gunten et al. |
| 5,852,513 | A * | 12/1998 | McDole .................. G02B 1/11 348/834 |
| 5,926,317 | A | 7/1999 | Cushing |
| 6,064,525 | A * | 5/2000 | Depauw ............... B60Q 1/2665 250/216 |
| 7,189,456 | B2 * | 3/2007 | King ...................... B32B 27/00 252/582 |
| 7,227,691 | B2 | 6/2007 | Kamikawa |
| 7,445,813 | B2 | 11/2008 | Ohbayashi |
| 7,520,607 | B2 | 4/2009 | Casper et al. |
| 7,556,376 | B2 | 7/2009 | Ishak et al. |
| 7,748,845 | B2 | 7/2010 | Casper et al. |
| 7,981,471 | B2 | 7/2011 | Mitsuishi et al. |
| 8,029,923 | B2 | 10/2011 | Friz et al. |
| 8,113,651 | B2 | 2/2012 | Blum et al. |
| 8,143,771 | B2 | 3/2012 | Shin et al. |
| 8,164,844 | B2 | 4/2012 | Toda et al. |
| 8,174,187 | B2 | 5/2012 | Cok |
| 8,233,219 | B2 | 7/2012 | Takada et al. |
| 8,329,247 | B2 | 12/2012 | Banerjee et al. |
| 8,360,574 | B2 | 1/2013 | Ishak et al. |
| 8,368,092 | B2 | 2/2013 | Baur et al. |
| 8,405,299 | B2 | 3/2013 | Toda et al. |
| 8,455,913 | B2 | 6/2013 | Epler et al. |
| 8,545,746 | B2 | 10/2013 | Kustandi et al. |
| 2002/0076562 | A1 | 6/2002 | Desu et al. |
| 2002/0181108 | A1 * | 12/2002 | Macchi ................ G02B 5/0808 359/580 |
| 2002/0193522 | A1 * | 12/2002 | Sun ...................... C07D 271/06 525/168 |
| 2003/0179455 | A1 * | 9/2003 | Hunt .................. G02B 27/0006 359/586 |
| 2004/0170838 | A1 | 9/2004 | Ambrosius et al. |
| 2005/0015122 | A1 * | 1/2005 | Mott ...................... A61M 21/00 607/88 |
| 2006/0119954 | A1 | 6/2006 | Casper et al. |
| 2007/0097510 | A1 * | 5/2007 | Carlson ................. C03C 17/28 359/589 |
| 2007/0262714 | A1 | 11/2007 | Bylsma |
| 2008/0065177 | A1 | 3/2008 | Casper et al. |
| 2008/0094566 | A1 | 4/2008 | Ishak et al. |
| 2008/0186448 | A1 | 8/2008 | Ishak et al. |
| 2008/0221674 | A1 | 9/2008 | Blum et al. |
| 2008/0266690 | A1 | 10/2008 | Toda et al. |
| 2009/0231844 | A1 * | 9/2009 | Yin ............................ F21V 9/00 362/235 |
| 2010/0149483 | A1 * | 6/2010 | Chiavetta, III ........ G02B 5/289 351/159.63 |
| 2010/0157573 | A1 | 6/2010 | Toda et al. |
| 2010/0262211 | A1 | 10/2010 | Glaubitt et al. |
| 2011/0075096 | A1 | 3/2011 | Ishak et al. |
| 2011/0151135 | A1 | 6/2011 | Nagae et al. |
| 2011/0158275 | A1 | 6/2011 | Yoshizumi et al. |
| 2011/0164209 | A1 * | 7/2011 | Yoshihara ............... G02B 1/111 349/96 |
| 2011/0262656 | A1 | 10/2011 | Nagae et al. |
| 2012/0007557 | A1 | 1/2012 | Hayashigawa |
| 2012/0008217 | A1 | 1/2012 | Ishak et al. |
| 2012/0008326 | A1 | 1/2012 | Jou |
| 2012/0019138 | A1 | 1/2012 | Maxik et al. |
| 2012/0049306 | A1 | 3/2012 | Ohba et al. |
| 2012/0120515 | A1 | 5/2012 | Ishak et al. |
| 2012/0206050 | A1 | 8/2012 | Spero |
| 2012/0263872 | A1 | 10/2012 | Takada et al. |
| 2012/0266960 | A1 | 10/2012 | Fan et al. |
| 2012/0269998 | A1 | 10/2012 | Takahashi |
| 2012/0300447 | A1 | 11/2012 | Maxik et al. |
| 2014/0052220 | A1 * | 2/2014 | Pedersen ............... A61N 5/0618 607/88 |

FOREIGN PATENT DOCUMENTS

| | | |
|---|---|---|
| CA | 2362653 C | 2/2008 |
| CN | 101015035 A | 8/2007 |
| CN | 102439512 A | 5/2012 |
| CN | 102623435 A | 8/2012 |
| CN | 102828172 A | 12/2012 |
| EP | 2103574 A2 | 9/2009 |
| EP | 2199657 A2 | 6/2010 |
| EP | 2302093 A1 | 3/2011 |
| EP | 2319951 A1 | 11/2011 |
| EP | 2481104 A1 | 8/2012 |
| EP | 1633902 B1 | 12/2012 |
| EP | 2328540 B1 | 5/2013 |
| EP | 2602653 A1 | 6/2013 |
| EP | 2602654 A1 | 6/2013 |
| EP | 2602655 A1 | 6/2013 |
| JP | S63284502 A | 11/1988 |
| JP | H0667018 A | 3/1994 |
| JP | H10148715 A | 6/1998 |
| JP | H1152128 A | 2/1999 |
| JP | H11236662 A | 8/1999 |
| JP | 2000206578 A | 7/2000 |
| JP | 2002258038 A | 9/2002 |
| JP | 2002350610 A | 12/2002 |
| JP | 2003226957 A | 8/2003 |
| JP | 2004061810 A | 2/2004 |
| JP | 2005082837 A | 3/2005 |
| JP | 2010224350 A | 10/2010 |
| JP | 2010247426 A | 11/2010 |
| KR | 101262673 B1 | 5/2013 |
| WO | WO 99/57330 A1 | 11/1999 |
| WO | WO 03/005077 A1 | 1/2003 |
| WO | WO 2004/021071 A1 | 3/2004 |
| WO | WO 2006/097794 A1 | 9/2006 |
| WO | WO 2008/018871 A1 | 2/2008 |
| WO | WO 2008/024414 A2 | 2/2008 |
| WO | WO 2008/067109 A1 | 6/2008 |
| WO | WO 2008/106449 A1 | 9/2008 |
| WO | WO 2009/029575 A1 | 3/2009 |
| WO | WO 2010/053459 A1 | 5/2010 |
| WO | WO 2010/111499 A1 | 9/2010 |
| WO | WO 2010/144270 A1 | 12/2010 |
| WO | WO 2012/006265 A1 | 1/2012 |
| WO | WO 2012/145190 A2 | 10/2012 |
| WO | WO 2013/054820 A1 | 4/2013 |
| WO | WO 2013/076191 A1 | 5/2013 |
| WO | WO 2013/076192 A1 | 5/2013 |
| WO | WO 2013/076195 A1 | 5/2013 |
| WO | WO 2013/084176 A1 | 6/2013 |

(56) References Cited

FOREIGN PATENT DOCUMENTS

| WO | WO 2013/084177 A1 | 6/2013 |
| WO | WO 2013/084178 A1 | 6/2013 |
| WO | WO 2013/111134 A1 | 8/2013 |

OTHER PUBLICATIONS

OptiLayer Ltd, Features of OptiLayer Software Family, pp. 1-6, http://www.optilayer.com/features.htm, Apr. 21, 2010.
Aubé et al, Evaluating potential spectral impacts of various artificial lights on melatonin suppression, photosynthesis, and star visibility, Plos One vol. 8 No. 7, Jul. 5, 2013.
Supplementary European Search Report completed Oct. 7, 2015 in European Patent Application No. 13840507.
Office Action dated Nov. 2, 2016 in Chinese Patent Application No. 201380060366.1.

\* cited by examiner

MULTILAYER OPTICAL INTERFERENCE FILTER

FIELD OF THE INVENTION

The present invention relates to a device for filtering light and in particular to a device for filtering light from a broad spectrum light emitting diode device to reduce negative impacts of LEDs on starry skies observation, on human health, on road safety, on vegetation and on insect mortality.

BACKGROUND OF THE INVENTION

White light emitting diodes (hereinafter "LED" or "LEDs") in lighting constitutes a technological revolution. LED technology provides several benefits compared to lighting technology traditionally used. One major benefit of LED is its great life span that limits maintenance fees associated with its use. Another benefit of LED is that it is easily controlled or adjusted. LEDs offer great luminous efficiency.

Maximal luminous efficiency is currently achieved by LEDs emitting in the visible blue spectrum. In order to yield white lighting using LEDs, the most efficient approach consists of exciting a phosphorous coat using a blue LED. Phosphorus allows the conversion of an important part of blue light into white light (broad spectrum light). Therefore, electromagnetic spectrum of a white LED can be described as a superposition of a white spectrum covering a large part of the visible with a blue peak (see dotted curve in FIG. 5).

Presence of a blue peak in the resulting spectrum poses important problems with respect to the environment, road safety and human health. Indeed, scattering of blue light is more efficient than yellow light or red light. Blue light will therefore tend to cause more astronomical light pollution, especially for an observer located nearby the light source, because of its great scattering efficiency in the atmosphere than any other color of longer wavelength. A second positive impact of reducing the quantity of blue is linked to glare when light is scattering into the human eye. This phenomenon is growing with the ageing of the population, because with age, eyes become less transparent. Glare is a potential cause of road accidents. Less blue light is also less attractive for insects. This filter should therefore allow for a considerable reduction of insect mortality around street lights. It has been estimated that mortality rates are around 150 insects a night per street light.

Moreover, blue light plays an important role in circadian cycle regulation (biological clock) in several species, including humans. Indeed, regulation of this cycle in humans is achieved in part by a photoreceptor located in the eye retina that does not contribute to vision. When this photoreceptor is stimulated, melatonin production is suppressed and therefore conditioning the wake cycle. On the opposite, in the absence of blue light, melatonin is secreted, placing the organism in a state of rest. In addition to this regulation effect on the circadian cycle, melatonin is also a powerful antioxidant that allows the reparation of pre-cancer cells (as demonstrated in mice), therefore reducing risks of developing some types of cancers.

Brainard et al. 2001 and Thapan et al. 2001 characterized spectral response of melatonin suppression. This function is called Melatonin Suppression Action Spectrum (hereinafter "MSAS"). MSAS-based light filtering reduces negative impacts on human health from melatonin suppression cause by exposure to LEDs light. Also, as MSAS-based filtering decreases or eliminate the blue peak, using it to filter light from LED will also reduce negative impacts of LEDs on starry skies observation, road safety and on vegetation.

Multilayer optical interference filters are well known in the prior-art. This type of filters has been used to filter light from various light sources. Several patents related to multilayer layers are known to the inventors, including the following U.S. Pat. No. 2,412,496 by Dimmick, U.S. Pat. No. 2,624,238 by Widhop and Dimmick, U.S. Pat. No. 3,853,386 by Ritter and Pulker, U.S. Pat. No. 4,099,840 by van der Wal et al., U.S. Pat. No. 4,373,782 by Thelen, U.S. Pat. No. 4,838,629 by Maruyama et al., U.S. Pat. No. 5,007,710 by Nakajima et al., U.S. Pat. No. 5,274,661 by von Gunten et al., U.S. Pat. No. 5,926,317 by Cushing, U.S. Pat. No. 7,227,691 by Kamikawa. Several of these patents describe multilayer optical interference filters which include a plurality of layers of different thicknesses which, by optical interference, filters or reflects the light from a light source.

Also, filtering of light can be used for photo biological effects, notably to achieve an operative impact on the inhibition of melatonin secretion on humans. Known to the inventors are U.S. Pat. No. 5,274,403 by Gott, U.S. Pat. No. 7,520,607 by Casper et al., and U.S. patent application US 2012/0008326 by Jou. The design of such multilayer optical interference filters in accordance with photo biological parameters is more uncommon. Known to the inventors is U.S. Pat. No. 5,083,858 by Girerd which provides for sunglasses for multi-layer filtering of light for photo biologic purposes.

Such inventions do not filter the light as a function to a specific multi-maxima spectral response of melatonin suppression. Moreover, multi-layer optical interference filters have not been used for filtering light from LEDs directly from the light source in order to reduce the aforesaid undesirable effects.

The present invention overcomes some of the drawbacks of the prior-art by using a multi-layer optical interference filter which provides for the transmission in accordance with MSAS. One of the characteristics of MSAS is the presence of a secondary maximum on the spectrum function curve. MSAS can be characterized as the sum of two asymmetrical lognormal profiles. Such function cannot be processed through the use of a simple cut-off filter.

SUMMARY OF THE INVENTION

An object of the present invention is to provide a multilayer optical interference filter that can achieve such filtering, including the presence of the secondary maxima, and, if desired of an increased filtering a higher wavelengths.

It is one object of the invention to provide a light filtering device, comprising a multilayer light filtering stack, said multilayer light filtering stack being formed of a plurality of materials, each said material having a different refractive index, wherein thicknesses of each layer being chosen in order to provide optical interference yielding to transmittance characteristics (also known as the transmittance spectrum) of said multilayer light filtering device being equal to:

Transmittance=1−MSAS

Whereas MSAS is the Melatonin Suppression Action Spectrum for the human body.

This light filtering device can further include a gradual reduction of said transmittance as a function of the wavelength over 600 nm, notably to reduce negative impact of LED on vegetation due to the absorption peak of chlorophyll-a at approximately 660 nm.

In some embodiments, the light filtering device can be form of two different materials, one being of a higher refractive index and the other being of a lower refractive index. The two materials are alternated to form a stack of materials with alternating refractive indexes, therefore providing with optical interference in order to achieve the desired transmittance of the light filtering device as a function of the melatonin suppression action spectrum.

It is another object of the present invention to provide a method for fabricating such light filtering devices (yielding to a transmittance as a function of 1-melatonin suppression action spectrum), by depositing layers of material with different refractive index to form the light filtering device on a substrate. The layers deposition can be performed by a deposition method selected from a group comprising chemical vapor deposition, evaporation and epitaxial growth. This plurality of layers can be deposited on the surface of a transparent substrate. This transparent substrate can be, for example, a soda lime glass sheet or the encapsulating material surrounding the light emitting diode itself.

A preferred embodiments of this invention is a light filtering device, comprising a plurality of adjacent layers forming a stack, wherein: each of said layers comprising at least one material having a refractive index; wherein the refractive index of each of said layers is different than the refractive index of each of said adjacent layer; each of said layers having a predetermined thickness, wherein said thickness and said refractive index for each of said layers provide optical interference yielding to transmittance spectrum for the light filtering device being substantially equal to: (1−melatonin action suppression spectrum)

Various embodiments also include the light filtering device described hereinabove, wherein said thickness and said refractive index are determined in order for said light filtering device to provide said transmittance spectrum for light incidence substantially at a predetermined angle to said light filtering device; and/or maximum deviation of said transmittance spectrum over said (1−melatonin action suppression spectrum) is lower than 0.3 for wavelengths between 400 nm and 625 nm; and/or deviation of said transmittance spectrum over said (1−melatonin action suppression spectrum) is lower than 0.12 as an average for all wavelengths between 400 nm and 625 nm; and/or said transmittance spectrum further include a gradual reduction of transmittance as a function of the wavelength over wavelengths of 600 nm; and/or transmittance for said transmittance spectrum at a wavelengths of 650 nm is of 0.5; and/or said gradual reduction of transmittance over said transmittance spectrum is determined to prevent yellowing of transmitted light; and/or said a plurality of adjacent layers comprise a first set of layers having a first determined refractive index and a second set of layers made having a second determined refractive index, said first set of layers being interleaved with said second set of layers.

Embodiments of this invention also include the light filtering device described hereinabove, further comprising a transparent substrate and wherein said stack is affixed on said transparent substrate; said transparent substrate may be made of soda-lime glass. Alternatively, embodiments of this invention also include the light filtering device described hereinabove further comprising a tint-variable substrate, said tint-variable substrate being selected from a group consisting of photochromic glass and electro-chromic glass.

Various embodiment include the light filtering device described hereinabove, further comprising a light emitting diode which is at least partially enclosed in a transparent protective encapsulation structure, wherein said multilayer light filtering stack is affixed on said transparent protective encapsulation structure; and/or further comprising a light emitting diode and a phosphorous-containing luminescent structure, wherein said light emitting diode is positioned as to illuminate said phosphorous-containing luminescent structure, and wherein said stack is affixed onto said phosphorous-containing luminescent structure.

Various embodiments include the light filtering device described hereinabove, wherein said stack of layers is affixed to an automotive vehicle's windshield; said stack of layers is affixed to ophthalmic lenses, said ophthalmic lenses being selected from a group consisting of prescription and non-prescription ophthalmic lenses; said stack of layers is affixed to lenses of externally worn eyewear, said eyewear being selected from a group consisting of eyeglasses, sunglasses, goggles and contact lenses; or, said stack of layers is affixed to surgically implantable intraocular lenses.

Preferred embodiments also include a method for fabricating a light filtering device, said method comprising: depositing, on top of a substrate, a plurality of adjacent layers, wherein each of said layers comprises at least one material having a refractive index different than the refractive index of each of said immediately adjacent layer, and wherein thicknesses and said refractive index for each of said layers provide optical interference yielding to transmittance spectrum for said multilayer light filtering device being substantially equal to: (1−melatonin action suppression spectrum).

Various embodiments also include the method described hereinabove, wherein: said transmittance spectrum further includes a gradual reduction of said transmittance as a function of the wavelength over wavelengths of 600 nm; and/or deposition of each of said layers is done by a deposition method selected from the group consisting of chemical vapor deposition, evaporation and epitaxial growth.

Preferred embodiments also include the use of the light filtering device described hereinabove for filtering light from a light emitting diode for street lighting; for filtering light from display from an electronic device, said electronic device being selected from the group consisting of television, computer screen, laptop computer, tablet computer, smartphone and portable gaming device; for filtering light from a light emitting diode in an hospital in order to regulate the wake and sleep periods of the patients in the hospital; or, for filtering light going through a transparent object, said transparent object being selected from a group consisting of ophthalmic lenses, windows, automotive windshields or automotive dashboards protection glass.

Various preferred embodiments include the light filtering device and the method for fabricating a light filtering device described hereinabove, wherein said layers form an integer number of pairs; said integer number of pairs of said layers may be selected from a group consisting of eight, eleven and fourteen.

BRIEF DESCRIPTION OF THE DRAWINGS

The invention may be better understood by the attached description and may be further illustrated by the figures, in which.

As many changes can be made to the preferred embodiment of the invention without departing from the scope thereof; it is intended that all matter contained herein be considered illustrative of the invention and not in a limiting sense.

DESCRIPTION OF PREFERRED EMBODIMENTS

In a preferred embodiment, we have assembled independent data measured by Brainard, G. C., Hanifin, J. P., Greeson, J. M., Byrne, B., Glickman, G., Gerner, E., Rollag, M. D. (2001) *Action Spectrum for Melatonin Regulation in Humans: Evidence for a Novel Circadian Photoreceptor*, The Journal of Neuroscience, 21(16), 6405-6412, and Thapan, K., Arendt, J., Skene, D. J. (2001) *Rapid Report— An action spectrum for melatonin suppression: evidence for a novel non-rod, non-cone photoreceptor system in humans*, Journal of Physiology, 535.1, 261-267. These measurements have been used to characterize the spectral response of melatonin suppression, the melatonin suppression action spectrum (MSAS), as shown by squares in FIG. 1.

In the present description of the invention, transmittance is expressed so that a transmittance of 1 corresponds to the total transmittance of the light, without absorption or reflection. Transmittance of 0 corresponds to no light being transmitted by the filter.

Figure 1:
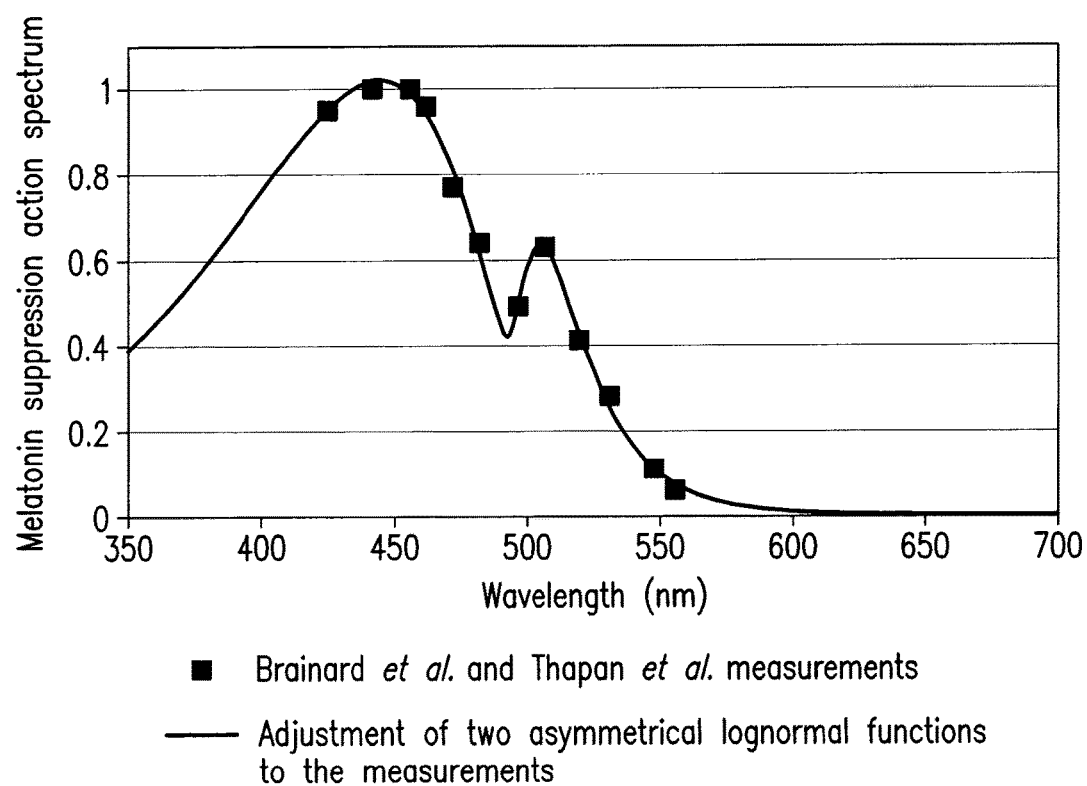
FIG. 1 is the Melatonin Suppression Action Spectrum (MSAS) showing Brainard et al. 2001 and Thapan et al. 2001's measurements and adjustment of two asymmetrical lognormal functions to Brainard et al. 2001 and Thapan et al. 2001's measurements.

A mathematical adjustment of a sum of two asymmetrical lognormal profiles were carried out with the goal of determining an analytical equation that would allow for a characterization of MSAS at any wavelength. This equation is illustrated in FIG. 1 (curve) by $MSAS_a$, which is fitted on MSAS measurements. FIG. 1 further illustrates the quality of the mathematical adjustment of data using this analytical model.

This embodiment is based on this analytical adjustment of MSAS. In order to minimize undesirable impacts of blue lighting as identified herein above, we created an interference optical filter which spectral transmittance between 400 nm and 625 nm follows as close as possible the resulting curve (designated herein as "T_i") using the following equation:

$$T\_i = 1 - MSAS_a$$

Figure 2:
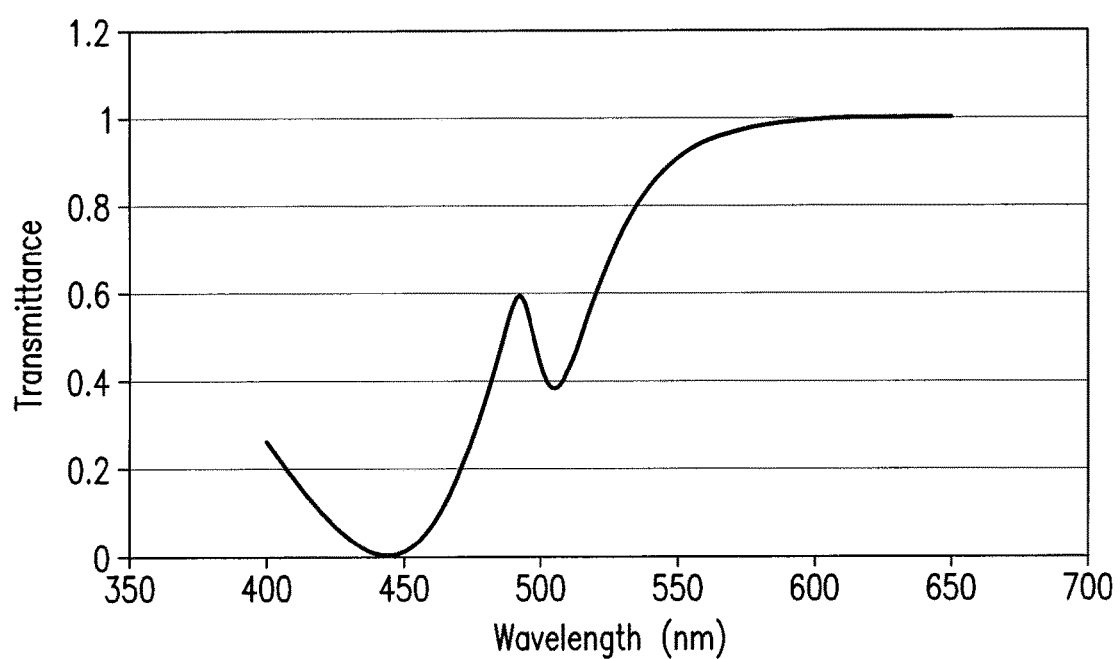
FIG. 2 shows the desired spectral transmittance in order to reduce impact of nocturnal light on the circadian cycle.

The above equation is traced in FIG. 2. This embodiment imposes spectral constraints between 400 to 650 nm.

Figure 3:
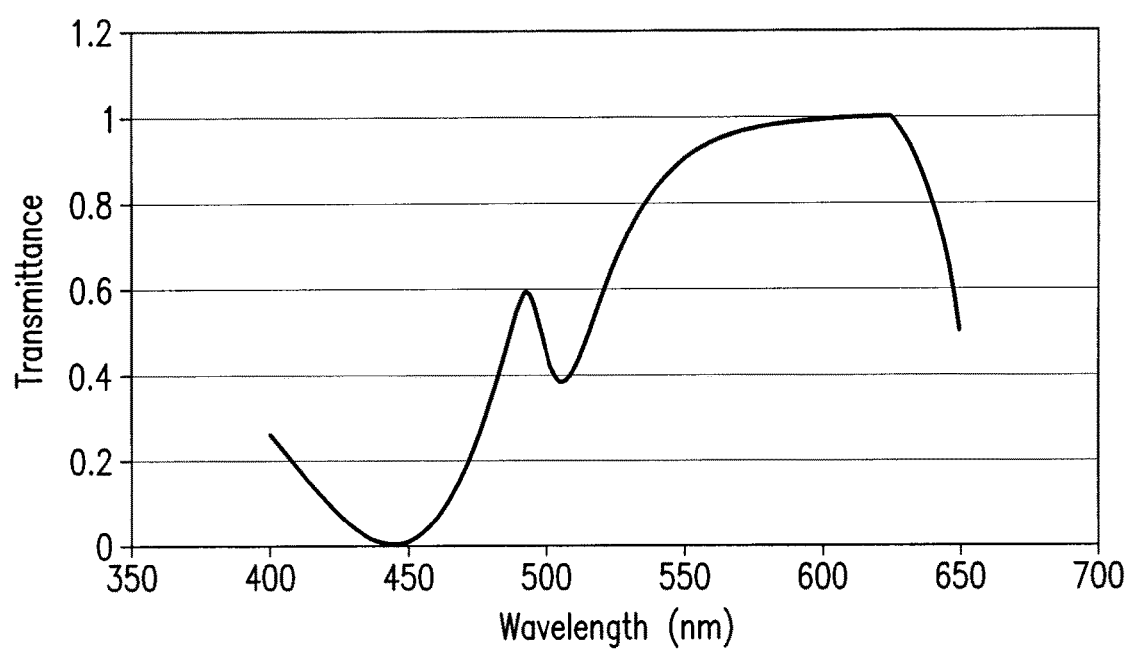
FIG. 3 is the T_e spectral transmittance for the 400 to 625 nm range with a decline of transmittance imposed in order to reach 0.5 transmittance at 650 nm.

In addition to this constraint of minimizing the negative impact of blue on human health and starry skies, we added a supplementary constraint to reduce by at least half the quantity of light transmitted by the filter beyond 650 nm. This constraint aims at reducing negative impact of night lighting on terrestrial and aquatic vegetation located near lighting devices. Such disturbance can lead to disequilibrium in surrounding ecosystems. For instance, growth of blue-green algae can be promoted by lighting devices located near water surfaces. This modified transmittance curve (designated herein as "T_e") is shown in FIG. 3. Numerical data for this curve are shown in TABLE 2. The reason behind this modification is that chlorophyll-a (the most common and abundant type of chlorophyll in plants) has two absorption peaks around 430 nm and around 660 nm, respectively. The first peak at 430 nm is already well-filtered by T_i transmittance, but not the 660 nm peak. Adding gradual reduction of transmittance, up to a maximum of 0.5 at 650 nm, allows for the important reduction of impact on the 660 nm peak. Therefore, plants located near lighting devices will be weakly stimulated at night. In supplement of the impact reduction on plants, the lower transmittance in the red will reduce the effect of light yellowing caused by filters having T_i transmittance. Moreover, spectral transmittance of the filter in blue (notably the peak just under 500 nm) reduces the yellowing effect compared to a simple long-pass filter.

Figure 3A:
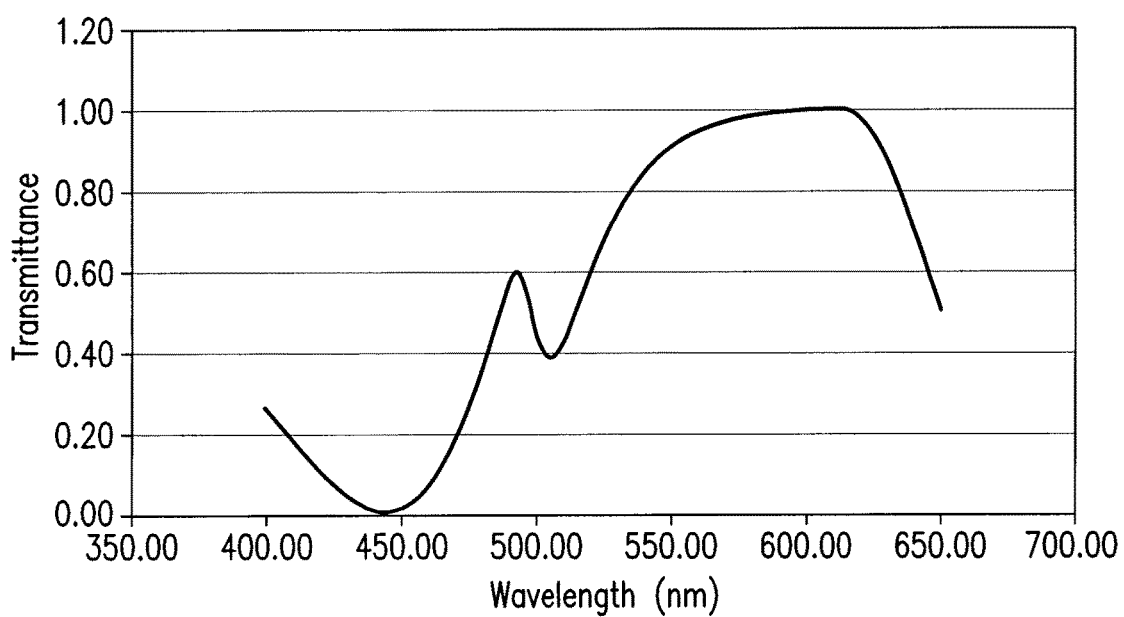
FIG. 3A is the T_e spectral transmittance, similar to FIG. 3 but with improved continuity for the wavelength affected by the imposed decline of transmittance.

FIG. 3A is the T_e spectral transmittance for the 400 to 625 nm range with a decline of transmittance imposed in order to reach 0.5 transmittance at 650 nm, similar to FIG. 3 but with improved continuity between the wavelengths affected by the decline of transmittance, and the smaller wavelengths corresponding substantially to T_i transmittance.

One of the embodiments is a filter composed of alternating layers of materials selected from $SiO_2$ and $TiO_2$. Other dielectric material combination and substrate as well as many other numbers of layers can be alternative embodiments of the present invention, using T_e transmittance. The T_e transmittance described in TABLE 2 can be used to define an ideal transmittance of the filter, as well as the performance criterion of the real filter.

Figure 4A:
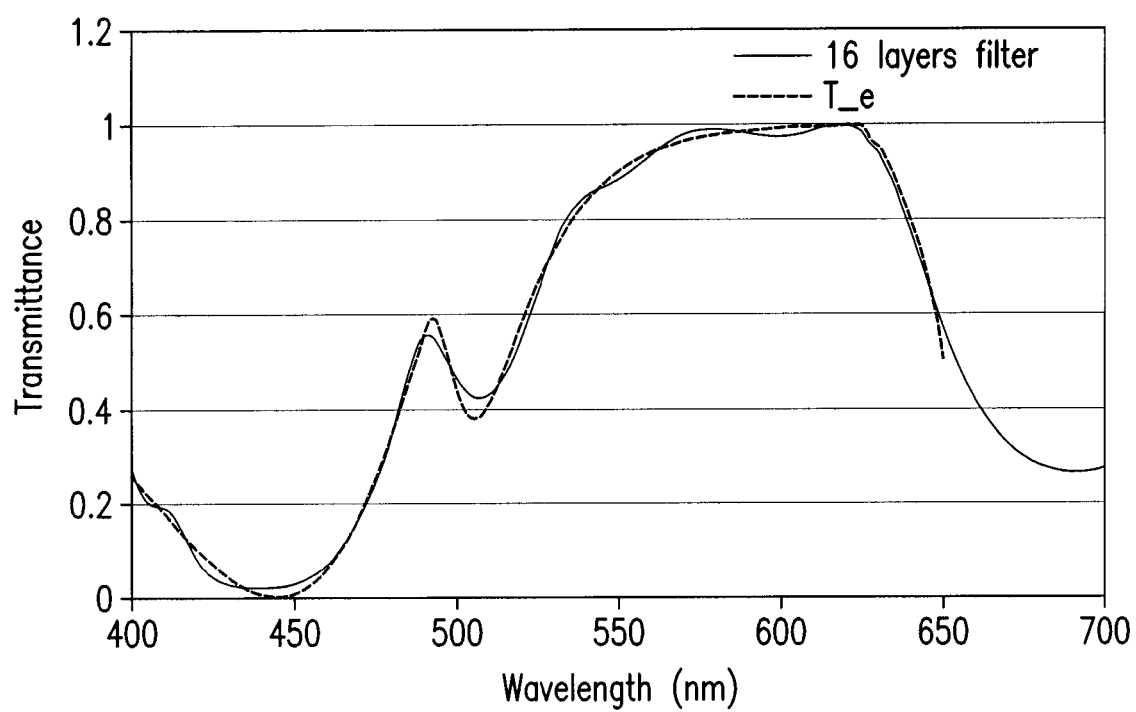
FIG. 4A is an example of filter transmittance in order to satisfy T_e transmittance spectrum, for 16 alternating $TiO_2$ and $SiO_2$ layers on a soda-lime substrate of toughened glass.
Figure 4B:
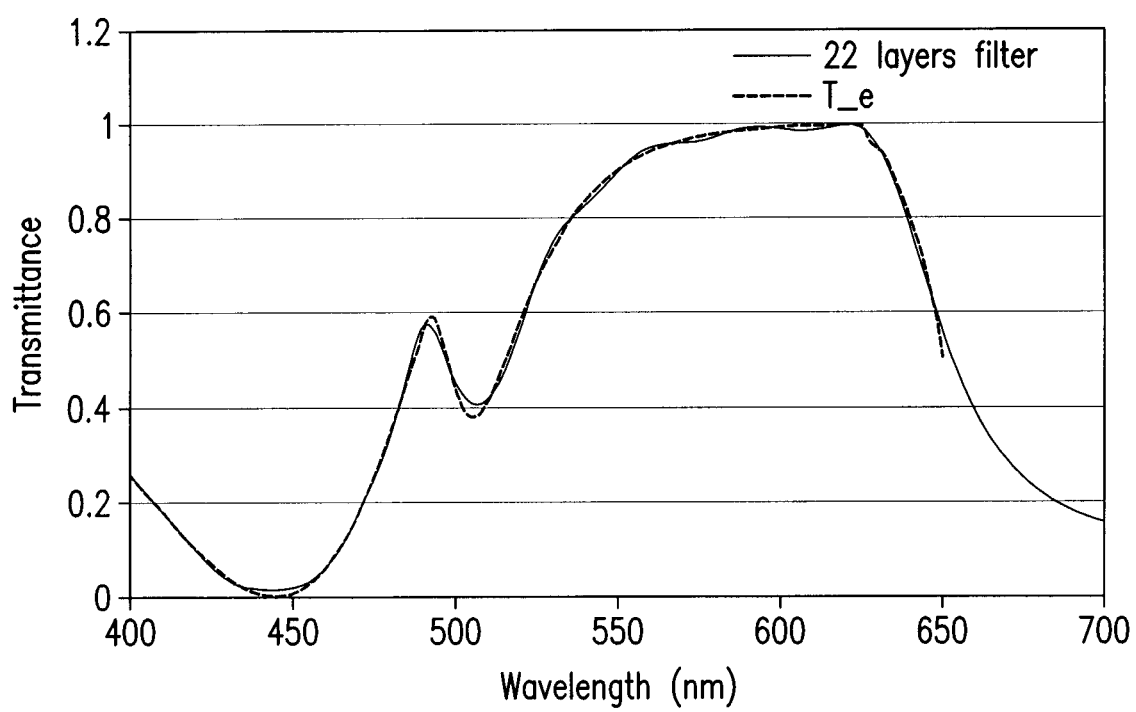
FIG. 4B is an example of filter transmittance in order to satisfy T_e transmittance spectrum, for 22 alternating $TiO_2$ and $SiO_2$ layers on a soda-lime substrate of toughened glass.
Figure 4C:
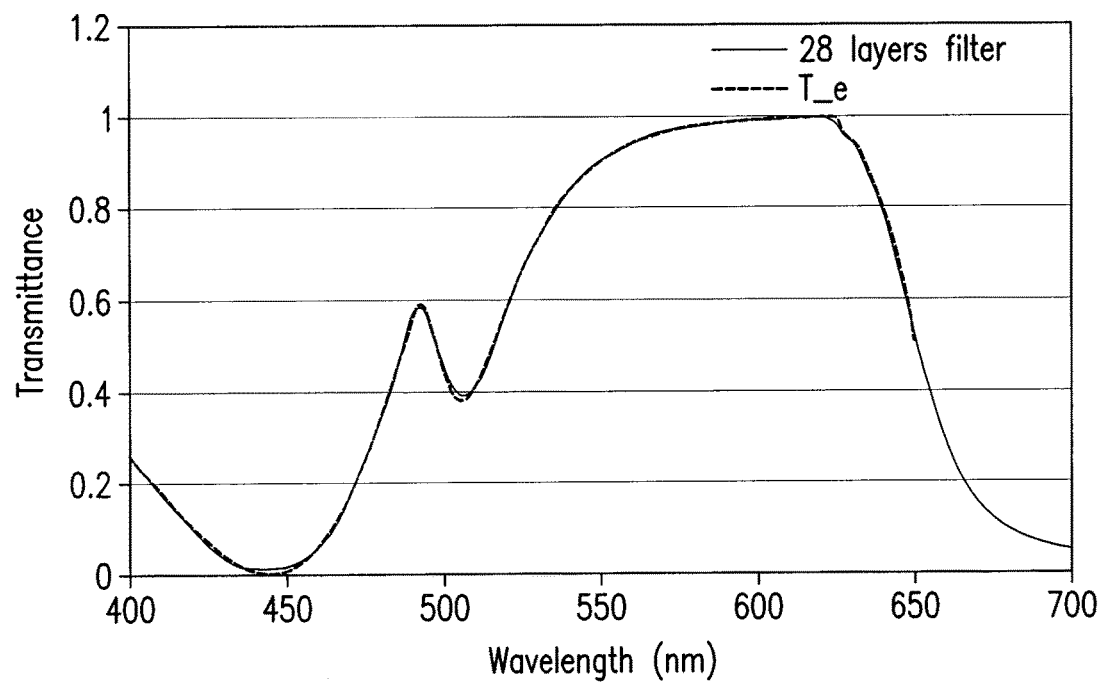
FIG. 4C is an example of filter transmittance in order to satisfy T_e transmittance spectrum, for 28 alternating $TiO_2$ and $SiO_2$ layers on a soda-lime substrate of toughened glass.
Figure 5:
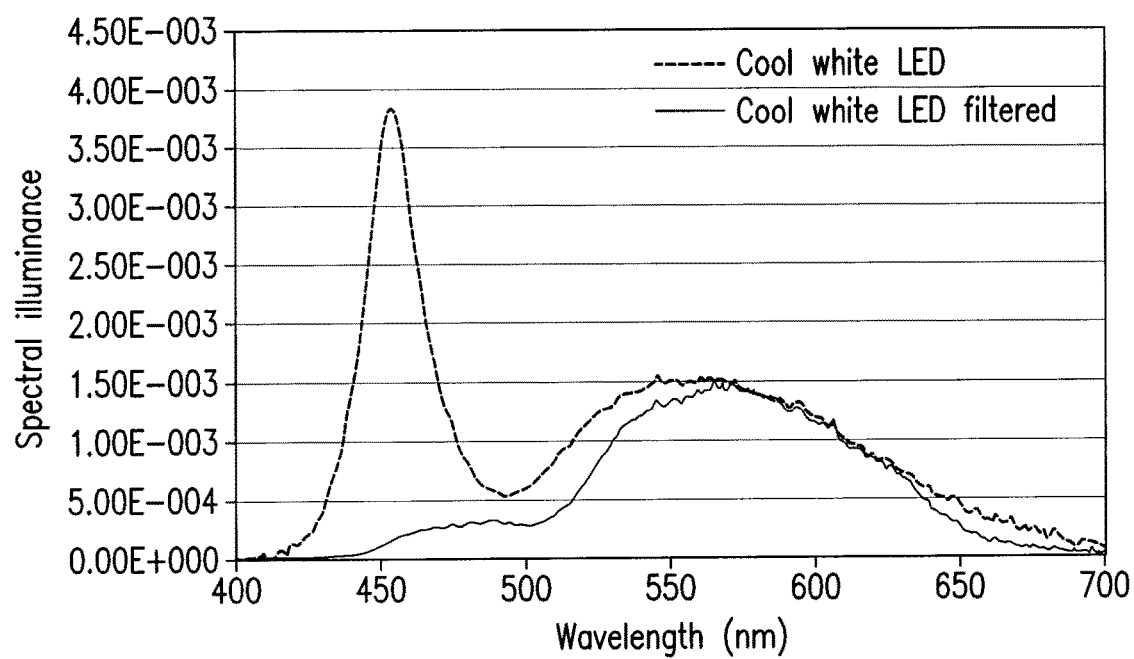
FIG. 5 is an example of the filtering effect on a white LED light source by a filter made in accordance with the present invention.

FIGS. 4A, 4B and 4C show examples of transmittance from filters satisfying the transmittance criteria of the present invention. FIG. 4A corresponds to the theoretical transmittance curve of a 16 layers filter, FIG. 4B to a 22 layers filter and FIG. 4C to a 28 layers filter. A similar transmittance curve is substantially obtained in these three cases and compared with the desired theoretical transmittance (T_e).

As will be understood by a person skilled in the art, computers may be used to perform calculations of the desired thickness for each layer of a multi-layers filter, as a function of the desired total number of layers and of the transmittance spectrum which is required. As an example, the OpenFilters™ software was used in to obtain the lists and thicknesses of each layer for the three examples above, with a desired transmittance equal to T_e. Details on how this software operates are given by Stéphane Larouche and Ludvik Martinu, (2008) *OpenFilters: open-source software for the design, optimization, and synthesis of optical filters*, Applied Optics, vol. 47, no. 13, p. C219-C230. The fabrication characteristics calculated by this software for the filter of FIG. 4A can be found in TABLE 1A below, the fabrication characteristics used for the filter of FIG. 4B can be found in TABLE 1B below and the fabrication characteristics used for the filter of FIG. 4C can be found in TABLE 1C below.

Figure 6:
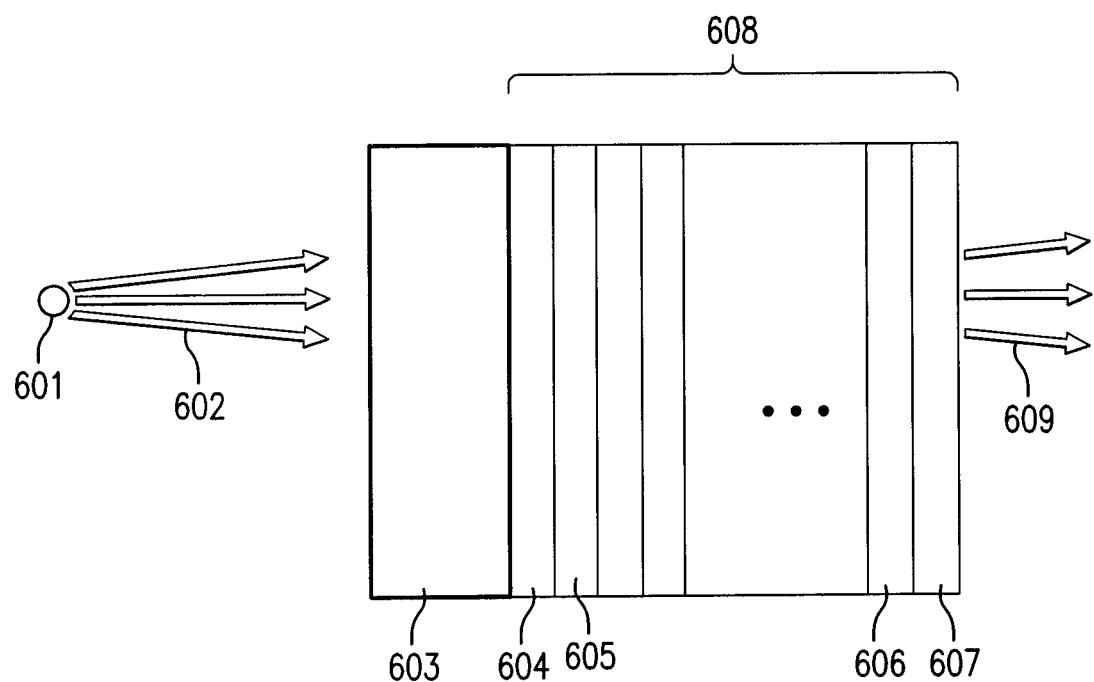
FIG. 6 is a schematic example of a preferred embodiment whereas a plurality of alternating layers is used for the filtering of light from a LED in accordance with the present invention. It should be noted that the invention is shown in a schematic form, for illustrative purposes only.

FIG. 6 illustrates one embodiment of the present invention whereas a LED (601) emits light (602) over a broad spectrum. The light has an emission spectrum characteristic of LED coated by a phosphorus-containing material, which spectrum includes a large amount of light in the blue. The light travels through a soda-lime glass substrate (603), prior from being filtered by a multilayer optical interference filter composed of a stack comprising a plurality of layers having a different refractive index (608). The layers are composed of alternating layers of a material with a first refractive index (604, 606, and others with the stack of 608) with layers of a material with a second refractive index (605, 607 and others in the stack of 608). The thickness of each layer is calculated in order to obtain a transmittance of light corresponding to T_i as calculated hereinabove. The transmitted light (609) has therefore a reduced blue component, which in turns helps to reduce negative impacts on starry skies observation, on human health, on road safety.

In another preferred embodiment, thickness of each layer is calculated in order to obtain a transmittance of light corresponding to T_e as calculated hereinabove if it is desirable to reduce the impact of LED lighting to vegetation due to the absorption of chlorophyll-a as discussed herein.

Such plurality of layers can be deposited by various methods of deposition of thin layers, including chemical vapor deposition, evaporation and epitaxial growth. The deposition method can be chosen in order to minimize the amounts of defects of the multilayer optical interference filter.

In another embodiment, the soda-lime glass substrate and the stack of layers forming the optical interference filter can have their relative position inverted relative to the LED, having therefore the light from the LED go through the stack of layers and filtered prior to being transmitted through the glass substrate.

In other embodiments, instead of alternating materials having a first refractive index with material with a second refractive index, it is possible to integrate layers of materials with more than two refractive indexes. For example, layers of material with a third refractive index may be used at various location within the stack of layers, inserted at diverse positions within the stack of layers, to facilitate the fabrication or to enhance the durability of the filtering device. For example, a protective layer can be deposited on top of the optical interference layer, which protective layer can be taken into account in the calculation of the various layers thickness in order to achieve transmittance in accordance with T_e desired transmittance.

Figure 7:
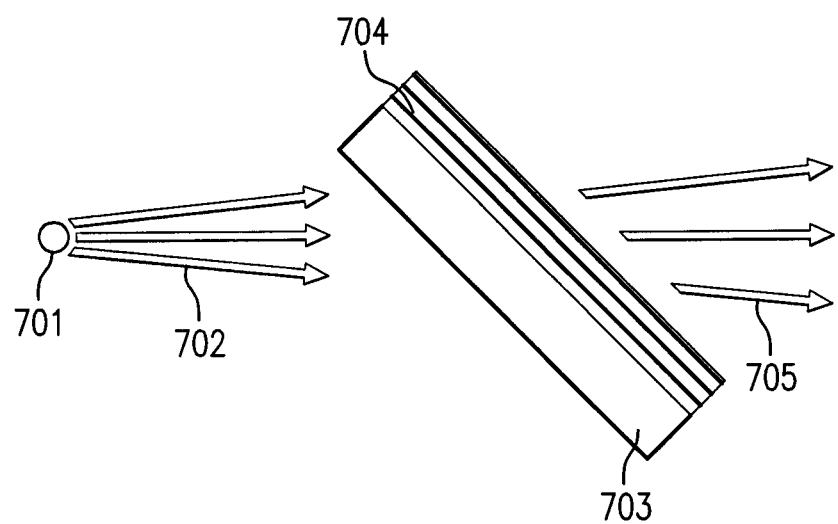
FIG. 7 is a schematic illustration of a preferred embodiment whereas the filter is designed to have the desired transmittance spectrum for incoming light at an incident angle which is not perpendicular to the surface of the filter.

In various preferred embodiments, the thicknesses of the layers of the optical interference filter are calculated as a function of obtaining the desired transmittance for incident light coming onto the surface of the filtering device at a determined angle. It may be desirable in some applications for the transmittance to be optimal under an angle of incidence for the incoming light. For example, in street lighting applications, the light from a light source may be at incident on the filter at a determined non-perpendicular angle to the surface. This angle depends on many criteria, such as the desired appearance of the street lighting device. Therefore the layers should be calculated so that the desired transmittance curve for the filtering device is optimal at this determined angle. FIG. 7 is a schematic illustration of a preferred embodiment whereas the filter is designed to have the desired transmittance spectrum for incoming light at an incident angle which is not perpendicular to the surface of the filter. As an example, a light source (701) illuminates the surface of the soda-lime glass substrate (703), with incoming light (702) arriving at the surface of the soda-lime glass substrate at an angle of approximately 45 degree. The light then travels through said soda-lime glass substrate and to the multi-layer interference filter (704). Light is partly transmitted (705) by the multi-layer interference filter, the latter being designed in accordance with the present invention. Transmittance of the light is therefore in accordance with the T_e spectrum.

Alternatively, the multi-layer interference filter may be affixed at the interior surface of the soda-lime glass, therefore filtering the light before it travels through the soda-lime glass. Such configuration may be desirable to protect the multi-layer filter from abrasion and scratches. For example, in a handheld electronic device, such as a smartphone, where a transmittance spectrum corresponding to T_e is desire, the multi-layer filter may be deposited on the side of the glass surface facing the interior of said handheld device.

Alternative embodiments also include a multi-layer interference filter providing a transmittance spectrum of T_e, whereas said multi-layer interference filter is sandwiched between two glass plates.

Alternatively, the multilayer optical interference filter may be deposited directly on the surface of the light emitting device. Typically, a white LED device is encapsulated within a protection shell, on which the optical interference filter could be deposited. In some embodiments, it would also be possible to deposit the multilayer optical interference filter directly on the phosphorus-containing coating or substrate which provide for the broad spectrum of a LED, prior to encapsulating the device.

Figure 8:
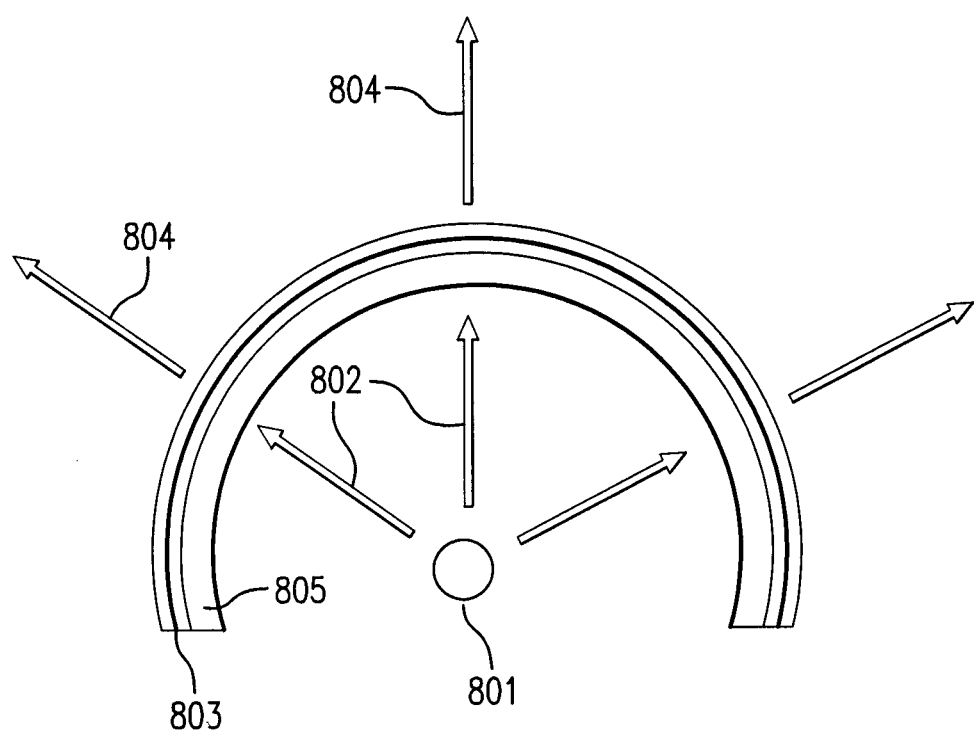
FIG. 8 is a schematic illustration of a preferred embodiment whereas a light emitting diode is at least enclosed in a transparent protective encapsulation structure, wherein said multilayer light filtering stack is affixed on said transparent protective encapsulation structure.

FIG. 8 is a schematic illustration of an embodiment whereas a LED (801) is enclosed in a transparent protective encapsulation structure (805), wherein a multi-layer interference filter (803) is affixed on top of said transparent protective encapsulation structure (805). The emitted light (802) travels from the LED to the transparent protective encapsulation structure (805) and is then partly transmitted (804) through the multi-layer interference filter (803). The transmittance spectrum corresponds to T_e as described hereinabove. Alternatively, the multi-layer interference filter may be affixed at the interior surface of the encapsulation structure.

It is to be understood by a person skilled in that art that variation over the T_e transmittance as calculated in accordance with the measured MSAS may not need to be followed exactly to achieve the desired effect of the filtering device. For example, the achieved transmittance from the filtering device may deviate from the T_e transmittance, or the Ti transmittance, as the case may be, without departing from the spirit and the scope of this invention. For example, the resulting transmittance curve may achieve the desired effect for this invention with a maximum deviation of as much as 0.3 in transmittance for a given wavelength. Typically, this maximum deviation can be calculated by measuring the maximum deviation between 400 nm and 625 nm. The desired filtering effect may be also achieved with as much as 0.12 average transmittance deviations over the same range of wavelengths (400 nm to 625 nm).

In some embodiments, such multilayer optical interference filters may be used to filter LED light from municipal outdoor lighting systems, in particular in the vicinity of astronomical observatories to reduce light pollution which adversely affect astronomical observations. It can also be used indoor, such as in hospitals and offices, to reduce negative impacts of LEDs on the circadian cycle of hospital patients and of office workers. Alternatively, a filter can be used to selectively enhance the impact of LED on the melatonin suppression mechanism to stimulate or regulate the wake and sleep periods at different moments or at different locations within a building.

Furthermore, this invention may be used in any lighting device for reducing the phenomenon of melatonin suppression; in an ophthalmic system to perform filtering of light in accordance with $T\_e$; in automotive windshields; in instruments for observing the back of a patient's eye to detect diseases. Embodiments further comprise use of this invention in conjunction with a photochromic, electro-chromic or other such changeable tints. Embodiments comprise the use for applications such as for ophthalmic lenses, windows, and automotive windshields or dashboards components. Embodiments also include the use of this invention in light bulbs, fluorescent lighting, LCD screen, LED lighting, computers, TV and computer monitors.

The present invention may also be used in ophthalmic lens, selected from prescription and non-prescription ophthalmic lenses, and in externally worn eyewear such as: eyeglasses, sunglasses, goggles and contact lenses, or surgically implantable intraocular lenses.

In yet other embodiments, a substrate supporting the multilayer optical interference filter may be composed of another transparent substrate, including a transparent substrate with optical properties to enhance the filtration effect from the multilayer optical interference filter. As many changes can be made to the preferred embodiment of the invention without departing from the scope thereof; it is intended that all matter contained herein be considered illustrative of the invention and not in a limiting sense.

The present disclosure includes all disclosures contained in the appended claims as well as disclosures in the foregoing description.

TABLE 1A

| Layers for filter composition - 16 layers | | | |
|---|---|---|---|
| Depth (nm) | n at 550 nm | Thikness (nm) | layer |
| 0 | 2.345975 | | |
| 88.544 | 2.345975 | 88.5 | 1 |
| 88.544 | 1.484672 | | |
| 267.708 | 1.484672 | 179.2 | 2 |
| 267.708 | 2.345975 | | |
| 472.023 | 2.345975 | 204.3 | 3 |
| 472.023 | 1.484672 | | |
| 542.109 | 1.484672 | 70.1 | 4 |
| 542.109 | 2.345975 | | |
| 584.846 | 2.345975 | 42.7 | 5 |
| 584.846 | 1.484672 | | |
| 646.811 | 1.484672 | 62.0 | 6 |
| 646.811 | 2.345975 | | |
| 696.44 | 2.345975 | 49.6 | 7 |
| 696.44 | 1.484672 | | |
| 727.685 | 1.484672 | 31.2 | 8 |
| 727.685 | 2.345975 | | |

TABLE 1A-continued

| Layers for filter composition - 16 layers | | | |
|---|---|---|---|
| Depth (nm) | n at 550 nm | Thikness (nm) | layer |
| 807.583 | 2.345975 | 79.9 | 9 |
| 807.583 | 1.484672 | | |
| 860.638 | 1.484672 | 53.1 | 10 |
| 860.638 | 2.345975 | | |
| 986.902 | 2.345975 | 126.3 | 11 |
| 986.902 | 1.484672 | | |
| 1090.346 | 1.484672 | 103.4 | 12 |
| 1090.346 | 2.345975 | | |
| 1223.111 | 2.345975 | 132.8 | 13 |
| 1223.111 | 1.484672 | | |
| 1255.531 | 1.484672 | 32.4 | 14 |
| 1255.531 | 2.345975 | | |
| 1425.489 | 2.345975 | 170.0 | 15 |
| 1425.489 | 1.484672 | | |
| 1530.853 | 1.484672 | 105.4 | 16 |

TiO2 = 2.34
SiO2 = 1.48

TABLE 1B

| Layers for filter composition - 22 layers | | | |
|---|---|---|---|
| Depth (nm) | n at 550 nm | Thikness (nm) | layer |
| 0 | 2.345975 | | |
| 146.374 | 2.345975 | 146.4 | 1 |
| 146.374 | 1.484672 | | |
| 234.004 | 1.484672 | 87.6 | 2 |
| 234.004 | 2.345975 | | |
| 386.799 | 2.345975 | 152.8 | 3 |
| 386.799 | 1.484672 | | |
| 436.103 | 1.484672 | 49.3 | 4 |
| 436.103 | 2.345975 | | |
| 507.6 | 2.345975 | 71.5 | 5 |
| 507.6 | 1.484672 | | |
| 562.314 | 1.484672 | 54.7 | 6 |
| 562.314 | 2.345975 | | |
| 586.67 | 2.345975 | 24.4 | 7 |
| 586.67 | 1.484672 | | |
| 630.269 | 1.484672 | 43.6 | 8 |
| 630.269 | 2.345975 | | |
| 713.568 | 2.345975 | 83.3 | 9 |
| 713.568 | 1.484672 | | |
| 782.348 | 1.484672 | 68.8 | 10 |
| 782.348 | 2.345975 | | |
| 815.699 | 2.345975 | 33.4 | 11 |
| 815.699 | 1.484672 | | |
| 848.199 | 1.484672 | 32.5 | 12 |
| 848.199 | 2.345975 | | |
| 903.834 | 2.345975 | 55.6 | 13 |
| 903.834 | 1.484672 | | |
| 986.55 | 1.484672 | 82.7 | 14 |
| 986.55 | 2.345975 | | |
| 1121.391 | 2.345975 | 134.8 | 15 |
| 1121.391 | 1.484672 | | |
| 1159.075 | 1.484672 | 37.7 | 16 |
| 1159.075 | 2.345975 | | |
| 1379.507 | 2.345975 | 220.4 | 17 |
| 1379.507 | 1.484672 | | |
| 1399.186 | 1.484672 | 19.7 | 18 |
| 1399.186 | 2.345975 | | |
| 1417.263 | 2.345975 | 18.1 | 19 |
| 1417.263 | 1.484672 | | |
| 1460.776 | 1.484672 | 43.5 | 20 |
| 1460.776 | 2.345975 | | |
| 1563.469 | 2.345975 | 102.7 | 21 |
| 1563.469 | 1.484672 | | |
| 1624.616 | 1.484672 | 61.1 | 22 |

TiO2 = 2.34
SiO2 = 1.48

TABLE 1C

Layers for filter composition - 28 layers

| Depth (nm) | n at 550 nm | Thikness (nm) | layer |
|---|---|---|---|
| 0 | 2.345975 | | |
| 156.171 | 2.345975 | 156.2 | 1 |
| 156.171 | 1.484672 | | |
| 214.382 | 1.484672 | 58.2 | 2 |
| 214.382 | 2.345975 | | |
| 377.222 | 2.345975 | 162.8 | 3 |
| 377.222 | 1.484672 | | |
| 439.913 | 1.484672 | 62.7 | 4 |
| 439.913 | 2.345975 | | |
| 503.392 | 2.345975 | 63.5 | 5 |
| 503.392 | 1.484672 | | |
| 546.192 | 1.484672 | 42.8 | 6 |
| 546.192 | 2.345975 | | |
| 574.76 | 2.345975 | 28.6 | 7 |
| 574.76 | 1.484672 | | |
| 629.532 | 1.484672 | 54.8 | 8 |
| 629.532 | 2.345975 | | |
| 718.671 | 2.345975 | 89.1 | 9 |
| 718.671 | 1.484672 | | |
| 774.451 | 1.484672 | 55.8 | 10 |
| 774.451 | 2.345975 | | |
| 803.442 | 2.345975 | 29.0 | 11 |
| 803.442 | 1.484672 | | |
| 851.136 | 1.484672 | 47.7 | 12 |
| 851.136 | 2.345975 | | |
| 902.759 | 2.345975 | 51.6 | 13 |
| 902.759 | 1.484672 | | |
| 971.65 | 1.484672 | 68.9 | 14 |
| 971.65 | 2.345975 | | |
| 1109.77 | 2.345975 | 138.1 | 15 |

TABLE 1C-continued

Layers for filter composition - 28 layers

| Depth (nm) | n at 550 nm | Thikness (nm) | layer |
|---|---|---|---|
| 1109.77 | 1.484672 | | |
| 1152.674 | 1.484672 | 42.9 | 16 |
| 1152.674 | 2.345975 | | |
| 1371.808 | 2.345975 | 219.1 | 17 |
| 1371.808 | 1.484672 | | |
| 1411.267 | 1.484672 | 39.5 | 18 |
| 1411.267 | 2.345975 | | |
| 1415.311 | 2.345975 | 4.0 | 19 |
| 1415.311 | 1.484672 | | |
| 1500.871 | 1.484672 | 85.6 | 20 |
| 1500.871 | 2.345975 | | |
| 1612.1 | 2.345975 | 111.2 | 21 |
| 1612.1 | 1.484672 | | |
| 1657.648 | 1.484672 | 45.5 | 22 |
| 1657.648 | 2.345975 | | |
| 1756.846 | 2.345975 | 99.2 | 23 |
| 1756.846 | 1.484672 | | |
| 1900.618 | 1.484672 | 143.8 | 24 |
| 1900.618 | 2.345975 | | |
| 1984.048 | 2.345975 | 83.4 | 25 |
| 1984.048 | 1.484672 | | |
| 2131.52 | 1.484672 | 147.5 | 26 |
| 2131.52 | 2.345975 | | |
| 2215.831 | 2.345975 | 84.3 | 27 |
| 2215.831 | 1.484672 | | |
| 2290.21 | 1.484672 | 74.4 | 28 |

$TiO_2$ = 2.34
$SiO_2$ = 1.48

TABLE 2

T_e Transmittance Curve

| Wavelength (nm) | Te | W (nm) | Te | W (nm) | Te | W (nm) | Te | W (nm) | Te | W (nm) | Te | W (nm) | Te | W (nm) | Te | W (nm) | Te | W (nm) | Te |
|---|---|---|---|---|---|---|---|---|---|---|---|---|---|---|---|---|---|---|---|
| 400.0 | 0.259 | 425.0 | 0.069 | 450.0 | 0.006 | 475.0 | 0.253 | 500.0 | 0.442 | 525.0 | 0.664 | 550.0 | 0.901 | 575.0 | 0.971 | 600.0 | 0.991 | 625.0 | 0.990 |
| 400.5 | 0.255 | 425.5 | 0.066 | 450.5 | 0.008 | 475.5 | 0.262 | 500.5 | 0.431 | 525.5 | 0.672 | 550.5 | 0.904 | 575.5 | 0.972 | 600.5 | 0.991 | 625.5 | 0.990 |
| 401.0 | 0.250 | 426.0 | 0.063 | 451.0 | 0.009 | 476.0 | 0.271 | 501.0 | 0.421 | 526.0 | 0.679 | 551.0 | 0.906 | 576.0 | 0.973 | 601.0 | 0.991 | 626.0 | 0.980 |
| 401.5 | 0.246 | 426.5 | 0.060 | 451.5 | 0.011 | 476.5 | 0.280 | 501.5 | 0.412 | 526.5 | 0.686 | 551.5 | 0.908 | 576.5 | 0.973 | 601.5 | 0.992 | 626.5 | 0.980 |
| 402.0 | 0.242 | 427.0 | 0.057 | 452.0 | 0.013 | 477.0 | 0.289 | 502.0 | 0.405 | 527.0 | 0.693 | 552.0 | 0.911 | 577.0 | 0.974 | 602.0 | 0.992 | 627.0 | 0.970 |
| 402.5 | 0.238 | 427.5 | 0.054 | 452.5 | 0.014 | 477.5 | 0.298 | 502.5 | 0.398 | 527.5 | 0.700 | 552.5 | 0.913 | 577.5 | 0.975 | 602.5 | 0.992 | 627.5 | 0.970 |
| 403.0 | 0.234 | 428.0 | 0.051 | 453.0 | 0.016 | 478.0 | 0.308 | 503.0 | 0.392 | 528.0 | 0.707 | 553.0 | 0.915 | 578.0 | 0.975 | 603.0 | 0.992 | 628.0 | 0.960 |
| 403.5 | 0.230 | 428.5 | 0.049 | 453.5 | 0.019 | 478.5 | 0.317 | 503.5 | 0.388 | 528.5 | 0.714 | 553.5 | 0.917 | 578.5 | 0.976 | 603.5 | 0.992 | 628.5 | 0.960 |
| 404.0 | 0.226 | 429.0 | 0.046 | 454.0 | 0.021 | 479.0 | 0.327 | 504.0 | 0.384 | 529.0 | 0.720 | 554.0 | 0.919 | 579.0 | 0.976 | 604.0 | 0.992 | 629.0 | 0.960 |
| 404.5 | 0.222 | 429.5 | 0.043 | 454.5 | 0.023 | 479.5 | 0.337 | 504.5 | 0.382 | 529.5 | 0.727 | 554.5 | 0.921 | 579.5 | 0.977 | 604.5 | 0.993 | 629.5 | 0.950 |
| 405.0 | 0.218 | 430.0 | 0.041 | 455.0 | 0.026 | 480.0 | 0.347 | 505.0 | 0.380 | 530.0 | 0.733 | 555.0 | 0.923 | 580.0 | 0.977 | 605.0 | 0.993 | 630.0 | 0.950 |
| 405.5 | 0.213 | 430.5 | 0.038 | 455.5 | 0.028 | 480.5 | 0.357 | 505.5 | 0.380 | 530.5 | 0.739 | 555.5 | 0.925 | 580.5 | 0.978 | 605.5 | 0.993 | 630.5 | 0.940 |
| 406.0 | 0.209 | 431.0 | 0.036 | 456.0 | 0.031 | 481.0 | 0.367 | 506.0 | 0.380 | 531.0 | 0.745 | 556.0 | 0.927 | 581.0 | 0.979 | 606.0 | 0.993 | 631.0 | 0.940 |
| 406.5 | 0.205 | 431.5 | 0.033 | 456.5 | 0.034 | 481.5 | 0.377 | 506.5 | 0.382 | 531.5 | 0.751 | 556.5 | 0.929 | 581.5 | 0.979 | 606.5 | 0.993 | 631.5 | 0.930 |
| 407.0 | 0.201 | 432.0 | 0.031 | 457.0 | 0.037 | 482.0 | 0.388 | 507.0 | 0.384 | 532.0 | 0.757 | 557.0 | 0.931 | 582.0 | 0.980 | 607.0 | 0.993 | 632.0 | 0.920 |
| 407.5 | 0.197 | 432.5 | 0.029 | 457.5 | 0.041 | 482.5 | 0.398 | 507.5 | 0.387 | 532.5 | 0.763 | 557.5 | 0.932 | 582.5 | 0.980 | 607.5 | 0.994 | 632.5 | 0.910 |
| 408.0 | 0.193 | 433.0 | 0.027 | 458.0 | 0.044 | 483.0 | 0.409 | 508.0 | 0.391 | 533.0 | 0.768 | 558.0 | 0.934 | 583.0 | 0.980 | 608.0 | 0.994 | 633.0 | 0.910 |
| 408.5 | 0.189 | 433.5 | 0.025 | 458.5 | 0.048 | 483.5 | 0.419 | 508.5 | 0.395 | 533.5 | 0.774 | 558.5 | 0.936 | 583.5 | 0.981 | 608.5 | 0.994 | 633.5 | 0.900 |
| 409.0 | 0.185 | 434.0 | 0.023 | 459.0 | 0.051 | 484.0 | 0.430 | 509.0 | 0.400 | 534.0 | 0.779 | 559.0 | 0.937 | 584.0 | 0.981 | 609.0 | 0.994 | 634.0 | 0.900 |
| 409.5 | 0.181 | 434.5 | 0.021 | 459.5 | 0.055 | 484.5 | 0.441 | 509.5 | 0.406 | 534.5 | 0.785 | 559.5 | 0.939 | 584.5 | 0.982 | 609.5 | 0.994 | 634.5 | 0.890 |
| 410.0 | 0.177 | 435.0 | 0.019 | 460.0 | 0.059 | 485.0 | 0.451 | 510.0 | 0.412 | 535.0 | 0.790 | 560.0 | 0.940 | 585.0 | 0.982 | 610.0 | 0.994 | 635.0 | 0.880 |
| 410.5 | 0.173 | 435.5 | 0.017 | 460.5 | 0.063 | 485.5 | 0.462 | 510.5 | 0.419 | 535.5 | 0.795 | 560.5 | 0.942 | 585.5 | 0.983 | 610.5 | 0.994 | 635.5 | 0.870 |
| 411.0 | 0.169 | 436.0 | 0.015 | 461.0 | 0.068 | 486.0 | 0.473 | 511.0 | 0.426 | 536.0 | 0.800 | 561.0 | 0.943 | 586.0 | 0.983 | 611.0 | 0.994 | 636.0 | 0.860 |
| 411.5 | 0.165 | 436.5 | 0.014 | 461.5 | 0.072 | 486.5 | 0.484 | 511.5 | 0.434 | 536.5 | 0.805 | 561.5 | 0.945 | 586.5 | 0.983 | 611.5 | 0.995 | 636.5 | 0.850 |
| 412.0 | 0.161 | 437.0 | 0.012 | 462.0 | 0.077 | 487.0 | 0.495 | 512.0 | 0.441 | 537.0 | 0.810 | 562.0 | 0.946 | 587.0 | 0.984 | 612.0 | 0.995 | 637.0 | 0.840 |
| 412.5 | 0.157 | 437.5 | 0.011 | 462.5 | 0.082 | 487.5 | 0.506 | 512.5 | 0.449 | 537.5 | 0.814 | 562.5 | 0.947 | 587.5 | 0.984 | 612.5 | 0.995 | 637.5 | 0.830 |
| 413.0 | 0.154 | 438.0 | 0.009 | 463.0 | 0.087 | 488.0 | 0.517 | 513.0 | 0.458 | 538.0 | 0.819 | 563.0 | 0.949 | 588.0 | 0.985 | 613.0 | 0.995 | 638.0 | 0.820 |
| 413.5 | 0.150 | 438.5 | 0.008 | 463.5 | 0.092 | 488.5 | 0.528 | 513.5 | 0.466 | 538.5 | 0.823 | 563.5 | 0.950 | 588.5 | 0.985 | 613.5 | 0.995 | 638.5 | 0.810 |
| 414.0 | 0.146 | 439.0 | 0.007 | 464.0 | 0.097 | 489.0 | 0.539 | 514.0 | 0.475 | 539.0 | 0.828 | 564.0 | 0.951 | 589.0 | 0.985 | 614.0 | 0.995 | 639.0 | 0.800 |
| 414.5 | 0.142 | 439.5 | 0.006 | 464.5 | 0.103 | 489.5 | 0.550 | 514.5 | 0.484 | 539.5 | 0.832 | 564.5 | 0.952 | 589.5 | 0.986 | 614.5 | 0.995 | 639.5 | 0.800 |
| 415.0 | 0.138 | 440.0 | 0.005 | 465.0 | 0.108 | 490.0 | 0.560 | 515.0 | 0.493 | 540.0 | 0.836 | 565.0 | 0.953 | 590.0 | 0.986 | 615.0 | 0.995 | 640.0 | 0.790 |
| 415.5 | 0.135 | 440.5 | 0.004 | 465.5 | 0.114 | 490.5 | 0.569 | 515.5 | 0.502 | 540.5 | 0.840 | 565.5 | 0.955 | 590.5 | 0.986 | 615.5 | 0.995 | 640.5 | 0.780 |
| 416.0 | 0.131 | 441.0 | 0.003 | 466.0 | 0.120 | 491.0 | 0.577 | 516.0 | 0.511 | 541.0 | 0.844 | 566.0 | 0.956 | 591.0 | 0.987 | 616.0 | 0.995 | 641.0 | 0.770 |
| 416.5 | 0.127 | 441.5 | 0.002 | 466.5 | 0.126 | 491.5 | 0.583 | 516.5 | 0.520 | 541.5 | 0.848 | 566.5 | 0.957 | 591.5 | 0.987 | 616.5 | 0.996 | 641,5 | 0.760 |
| 417.0 | 0.123 | 442.0 | 0.002 | 467.0 | 0.132 | 492.0 | 0.587 | 517.0 | 0.529 | 542.0 | 0.852 | 567.0 | 0.958 | 592.0 | 0.987 | 617.0 | 0.996 | 642.0 | 0.750 |
| 417.5 | 0.120 | 442.5 | 0.001 | 467.5 | 0.139 | 492.5 | 0.588 | 517.5 | 0.538 | 542.5 | 0.855 | 567.5 | 0.959 | 592.5 | 0.987 | 617.5 | 0.996 | 642.5 | 0.740 |

TABLE 2-continued

T_e Transmittance Curve

| Wavelength (nm) | Te | W (nm) | Te | W (nm) | Te | W (nm) | Te | W (nm) | Te | W (nm) | Te | W (nm) | Te | W (nm) | Te | W (nm) | Te | W (nm) | Te |
|---|---|---|---|---|---|---|---|---|---|---|---|---|---|---|---|---|---|---|---|
| 418.0 | 0.116 | 443.0 | 0.001 | 468.0 | 0.145 | 493.0 | 0.588 | 518.0 | 0.547 | 543.0 | 0.859 | 568.0 | 0.960 | 593.0 | 0.988 | 618.0 | 0.996 | 643.0 | 0.730 |
| 418.5 | 0.112 | 443.5 | 0.000 | 468.5 | 0.152 | 493.5 | 0.585 | 518.5 | 0.556 | 543.5 | 0.863 | 568.5 | 0.961 | 593.5 | 0.988 | 618.5 | 0.996 | 643.5 | 0.720 |
| 419.0 | 0.109 | 444.0 | 0.000 | 469.0 | 0.159 | 494.0 | 0.580 | 519.0 | 0.565 | 544.0 | 0.866 | 569.0 | 0.962 | 594.0 | 0.988 | 619.0 | 0.996 | 644.0 | 0.710 |
| 419.5 | 0.105 | 444.5 | 0.000 | 469.5 | 0.166 | 494.5 | 0.573 | 519.5 | 0.574 | 544.5 | 0.869 | 569.5 | 0.963 | 594.5 | 0.988 | 619.5 | 0.996 | 644.5 | 0.700 |
| 420.0 | 0.102 | 445.0 | 0.000 | 470.0 | 0.173 | 495.0 | 0.564 | 520.0 | 0.583 | 545.0 | 0.873 | 570.0 | 0.964 | 595.0 | 0.989 | 620.0 | 0.996 | 645.0 | 0.680 |
| 420.5 | 0.098 | 445.5 | 0.000 | 470.5 | 0.180 | 495.5 | 0.554 | 520.5 | 0.592 | 545.5 | 0.876 | 570.5 | 0.964 | 595.5 | 0.989 | 620.5 | 0.996 | 645.5 | 0.660 |
| 421.0 | 0.095 | 446.0 | 0.000 | 471.0 | 0.188 | 496.0 | 0.542 | 521.0 | 0.600 | 546.0 | 0.879 | 571.0 | 0.965 | 596.0 | 0.989 | 621.0 | 0.996 | 646.0 | 0.640 |
| 421.5 | 0.092 | 446.5 | 0.001 | 471.5 | 0.195 | 496.5 | 0.530 | 521.5 | 0.609 | 546.5 | 0.882 | 571.5 | 0.966 | 596.5 | 0.989 | 621.5 | 0.996 | 646.5 | 0.630 |
| 422.0 | 0.088 | 447.0 | 0.001 | 472.0 | 0.203 | 497.0 | 0.517 | 522.0 | 0.617 | 547.0 | 0.885 | 572.0 | 0.967 | 597.0 | 0.990 | 622.0 | 0.996 | 647.0 | 0.620 |
| 422.5 | 0.085 | 447.5 | 0.002 | 472.5 | 0.211 | 497.5 | 0.504 | 522.5 | 0.625 | 547.5 | 0.888 | 572.5 | 0.968 | 597.5 | 0.990 | 622.5 | 0.997 | 647.5 | 0.600 |
| 423.0 | 0.082 | 448.0 | 0.002 | 473.0 | 0.219 | 498.0 | 0.491 | 523.0 | 0.633 | 548.0 | 0.891 | 573.0 | 0.969 | 598.0 | 0.990 | 623.0 | 0.997 | 648.0 | 0.580 |
| 423.5 | 0.078 | 448.5 | 0.003 | 473.5 | 0.227 | 498.5 | 0.478 | 523.5 | 0.641 | 548.5 | 0.893 | 573.5 | 0.969 | 598.5 | 0.990 | 623.5 | 0.997 | 648.5 | 0.560 |
| 424.0 | 0.075 | 449.0 | 0.004 | 474.0 | 0.236 | 499.0 | 0.465 | 524.0 | 0.649 | 549.0 | 0.896 | 574.0 | 0.970 | 599.0 | 0.991 | 624.0 | 0.997 | 649.0 | 0.540 |
| 424.5 | 0.072 | 449.5 | 0.005 | 474.5 | 0.244 | 499.5 | 0.453 | 524.5 | 0.657 | 549.5 | 0.899 | 574.5 | 0.971 | 599.5 | 0.991 | 624.5 | 0.993 | 649.5 | 0.520 |
|  |  |  |  |  |  |  |  |  |  |  |  |  |  |  |  |  |  | 650.0 | 0.500 |

What is claimed is:

1. A light filtering device, comprising a plurality of adjacent layers forming a stack, wherein:
    each of said layers comprising at least one material having a refractive index; wherein the refractive index of each of said layers is different than the refractive index of each of said adjacent layer;
    each of said layers having a predetermined thickness, wherein said thickness and said refractive index for each of said layers provide optical interference yielding to transmittance spectrum for the light filtering device being substantially equal to the equation
    transmittance=1−melatonin action suppression spectrum wherein maximum deviation of said transmittance spectrum over said (1−melatonin action suppression spectrum) is selected from the group consisting of:
        a) lower than 0.3 for wavelengths between 400 nm and 625 nm; and
        b) lower than 0.12 as an average for all wavelengths between 400 nm and 625 nm.

2. The light filtering device of claim 1, wherein said layers form an integer number of pairs.

3. The light filtering device of claim 2, wherein said integer number of pairs of said layers is selected from a group consisting of eight, eleven and fourteen.

4. The light filtering device of claim 1, wherein said thickness and said refractive index are determined in order for said light filtering device to provide said transmittance spectrum for light incidence substantially at a predetermined angle to said light filtering device.

5. The light filtering device of claim 1, wherein said transmittance spectrum further include a gradual reduction of transmittance as a function of the wavelength over wavelengths of 600 nm.

6. The light filtering device of claim 5, wherein transmittance for said transmittance spectrum at a wavelength of 650 nm is of 0.5.

7. The light filtering device of claim 5, wherein said gradual reduction of transmittance over said transmittance spectrum is determined to prevent yellowing of transmitted light.

8. The light filtering device of claim 1, wherein said a plurality of adjacent layers comprise a first set of layers having a first determined refractive index and a second set of layers made having a second determined refractive index, said first set of layers being interleaved with said second set of layers.

9. The light filtering device of claim 1, further comprising a transparent substrate and wherein said stack is affixed on said transparent substrate.

10. The light filtering device of claim 9, wherein said transparent substrate is made of soda-lime glass.

11. The light filtering device of claim 1, further comprising a tint-variable substrate, said tint-variable substrate being selected from a group consisting of photochromic glass and electro-chromic glass.

12. The light filtering device of claim 1, further comprising a light emitting diode which is at least partially enclosed in a transparent protective encapsulation structure, wherein said multilayer light filtering stack is affixed on said transparent protective encapsulation structure.

13. The light filtering device of claim 1, further comprising a light emitting diode and a phosphorous-containing luminescent structure, wherein said light emitting diode is positioned as to illuminate said phosphorous-containing luminescent structure, and wherein said stack is affixed onto said phosphorous-containing luminescent structure.

14. The light filtering device of claim 1, wherein said stack of layers is affixed to an automotive vehicle's windshield.

15. The light filtering device of claim 1, wherein said stack of layers is affixed to ophthalmic lenses, said ophthalmic lenses being selected from a group consisting of prescription and non-prescription ophthalmic lenses.

16. The light filtering device of claim 1, wherein said stack of layers is affixed to lenses of externally worn eyewear, said eyewear being selected from a group consisting of eyeglasses, sunglasses, goggles and contact lenses.

17. The light filtering device of claim 1, wherein said stack of layers is affixed to surgically implantable intraocular lenses.

18. The use of the light filtering device of claim 1 for filtering light from a light emitting diode for street lighting.

19. The use of the light filtering device of claim 1 for filtering light from display from an electronic device, said electronic device being selected from the group consisting of television, computer screen, laptop computer, tablet computer, smartphone and portable gaming device.

20. The use of the light filtering device of claim 1 for filtering light from a light emitting diode in an hospital in order to regulate the wake and sleep periods of patients in the hospital.

21. The use of the light filtering device of claim 1 for filtering light going through a transparent object, said transparent object being selected from a group consisting of ophthalmic lenses, windows, automotive windshields or automotive dashboards protection glass.

22. A method for fabricating a light filtering device, said method comprising: depositing, on top of a substrate, a plurality of adjacent layers, wherein each of said layers comprises at least one material having a refractive index different than the refractive index of each of said immediately adjacent layer, and wherein thicknesses and said refractive index for each of said layers provide optical interference yielding to transmittance spectrum for said multilayer light filtering device being substantially equal to the formula:

transmittance=1−melatonin action suppression spectrum wherein maximum deviation of said transmittance spectrum over said (1−melatonin action suppression spectrum) is selected from the group consisting of:

a) lower than 0.3 for wavelengths between 400 nm and 625 nm; and
b) lower than 0.12 as an average for all wavelengths between 400 nm and 625 nm.

23. The method of claim 22, wherein said layers form an integer number of pairs.

24. The method of claim 23, wherein said integer number of pairs of said layers is selected from a group consisting of eight, eleven and fourteen.

25. The method of claim 22, wherein said transmittance spectrum further includes a gradual reduction of said transmittance as a function of the wavelength over wavelengths of 600 nm.

26. The method of claim 22, wherein deposition of each of said layers is done by a deposition method selected from the group consisting of chemical vapor deposition, evaporation and epitaxial growth.

* * * * *